(12) United States Patent
Furuhi et al.

(10) Patent No.: US 8,739,916 B2
(45) Date of Patent: Jun. 3, 2014

(54) GAS DELIVERY DEVICE AND VEHICLE

(71) Applicant: Murata Manufacturing Co., Ltd., Nagaokakyo (JP)

(72) Inventors: Tomoshige Furuhi, Nagaokako (JP); Manabu Inoue, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/938,631

(22) Filed: Jul. 10, 2013

(65) Prior Publication Data
US 2013/0294953 A1  Nov. 7, 2013

Related U.S. Application Data

(63) Continuation of application No. PCT/JP2011/069687, filed on Aug. 31, 2011.

(30) Foreign Application Priority Data

Jan. 14, 2011 (JP) ................................. 2011-005835

(51) Int. Cl.
*B60D 1/24* (2006.01)
(52) U.S. Cl.
USPC ......................................................... 180/271
(58) Field of Classification Search
USPC ......................................................... 180/271
See application file for complete search history.

(56) References Cited

U.S. PATENT DOCUMENTS

| 7,359,105 B2 * | 4/2008 | Jacobs et al. ................... 359/245 |
| 8,563,151 B2 * | 10/2013 | Matsumoto et al. ............ 429/82 |
| 2008/0006651 A1 * | 1/2008 | Arakawa et al. ................. 222/52 |
| 2012/0264361 A1 * | 10/2012 | Scheer et al. .................... 454/75 |

FOREIGN PATENT DOCUMENTS

| JP | U-H06-64023 | 9/1994 |
| JP | 11-031299 A | 2/1999 |
| JP | 2002-240943 A | 8/2002 |
| JP | 2007-196760 A | 8/2007 |
| WO | WO-2008/099569 A1 | 8/2008 |

OTHER PUBLICATIONS

International Search Report and Written Opinion for PCT/JP2011/069687, date of mailing Dec. 20, 2011.

* cited by examiner

*Primary Examiner* — Faye M. Fleming
(74) *Attorney, Agent, or Firm* — Dickstein Shapiro LLP

(57) ABSTRACT

A scent delivery device includes two substrate units and a drive voltage power supply unit. A gap is provided between the two substrate units. The substrate units are placed so that the principal surfaces of their respective substrates face the gap. Each of the substrate units includes a plurality of linear electrodes. The linear electrodes are formed and arranged in the width direction on the principal surface of each of the substrates, and are electrically connected every predetermined period in their arrangement order. The drive voltage power supply unit applies drive voltages having the same repeating pattern to each set of electrically connected linear electrodes, with a predetermined phase difference. This configuration causes the frequencies of drive voltages applied to the respective substrate units to differ from each other, thereby setting the blowing direction to an arbitrary direction.

20 Claims, 15 Drawing Sheets

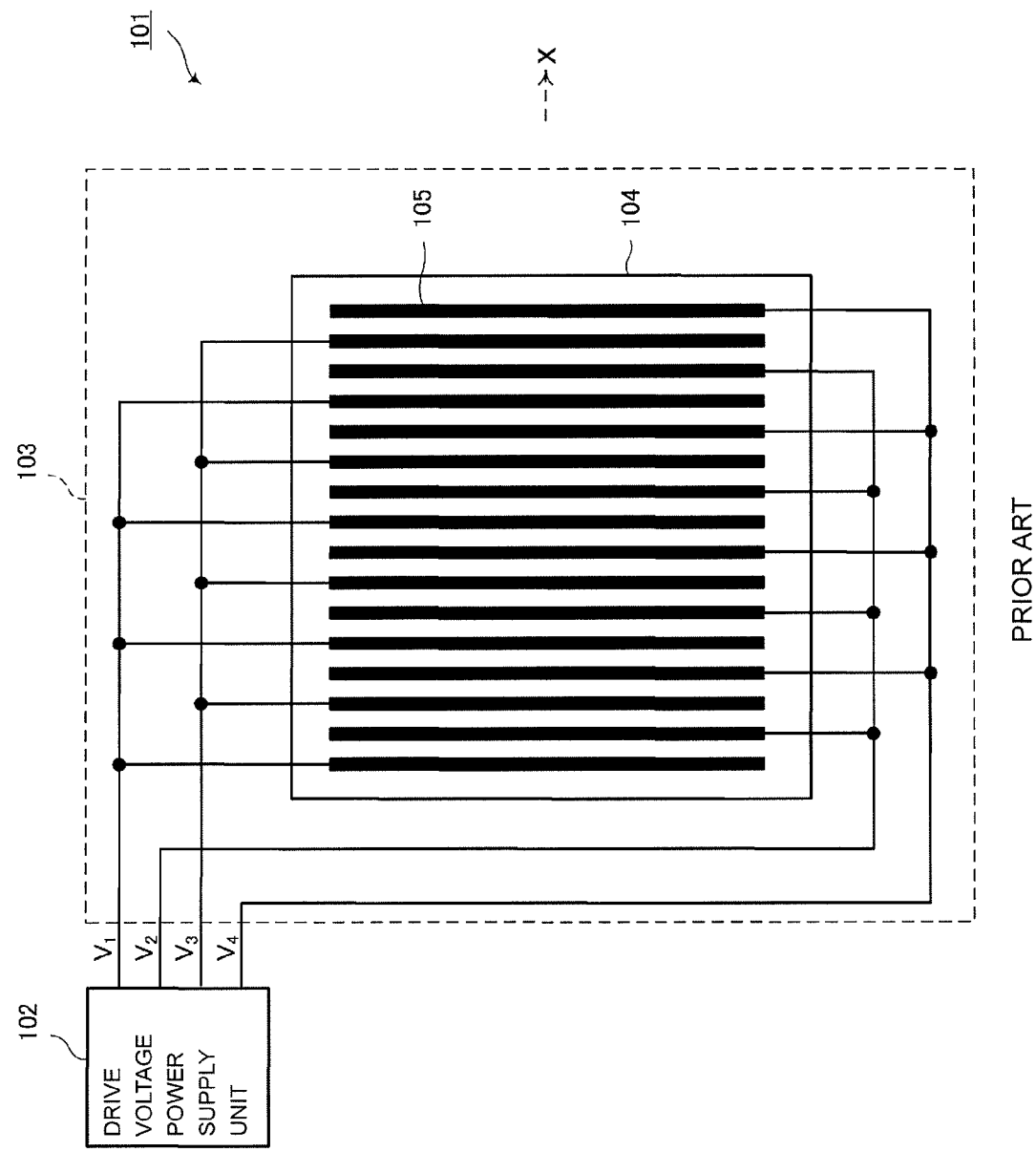

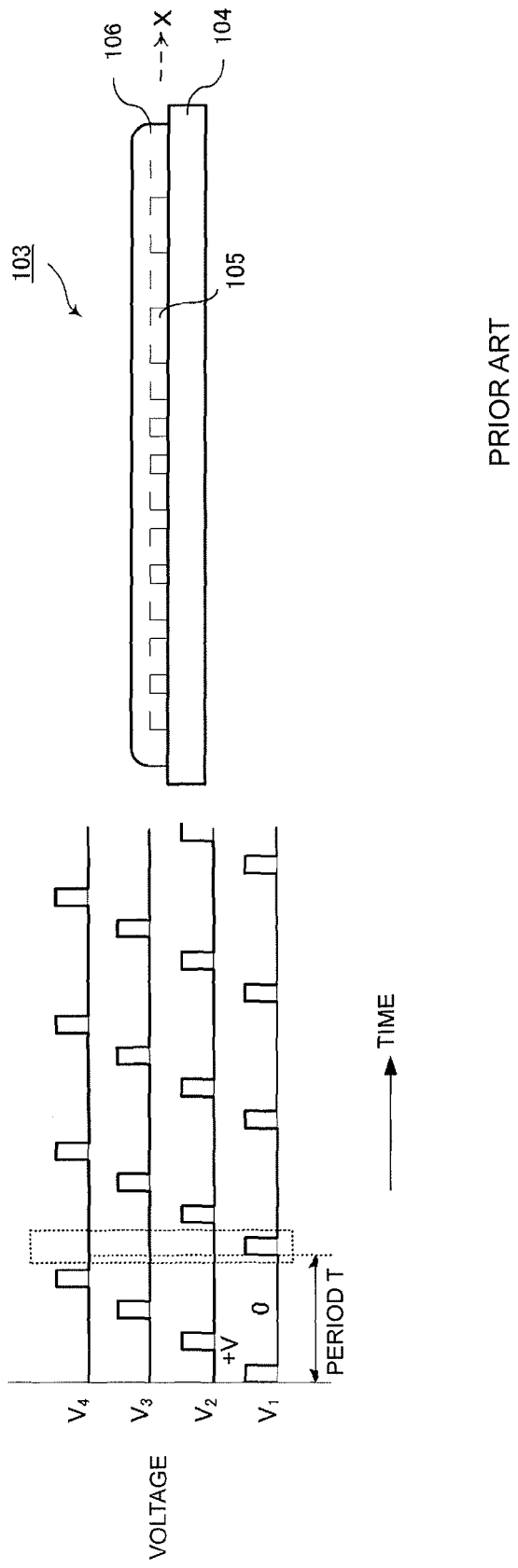

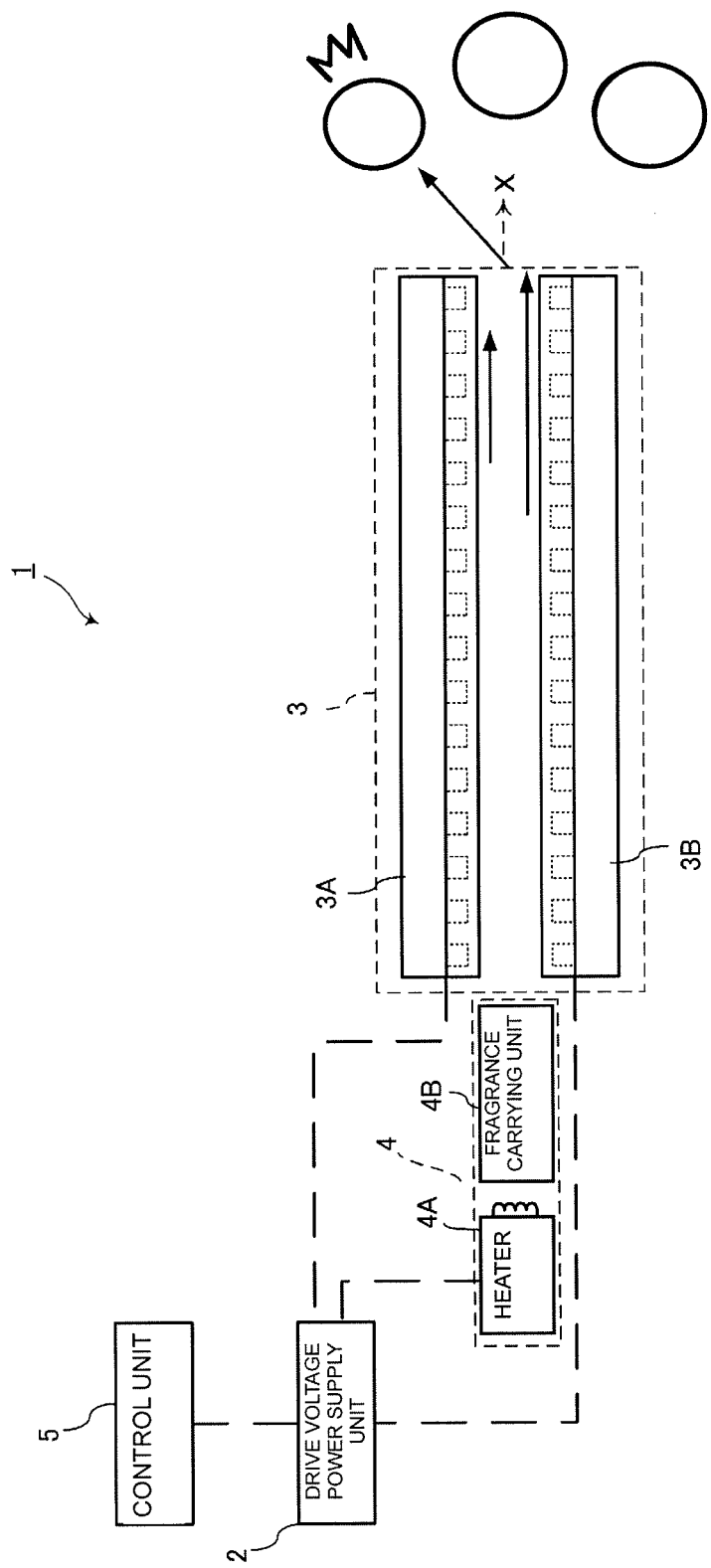

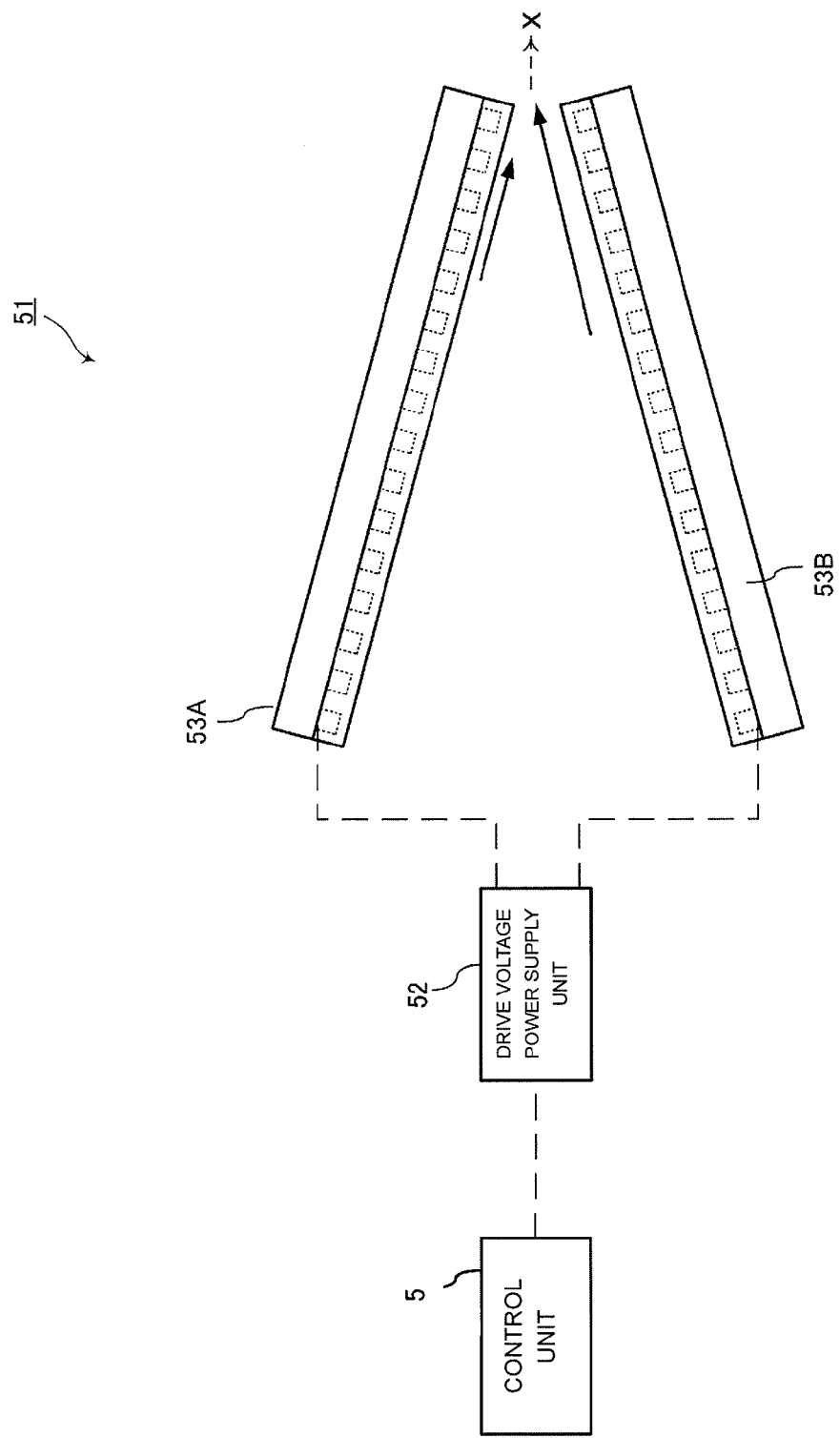

| $f_A$ [kHz] | $f_B$ [kHz] | $\theta$ [deg.] |
|---|---|---|
| -2.0 | 4.0 | -8.0 |
| -0.4 | 4.0 | -4.0 |
| 0 | 4.0 | -1.1 |
| 4.0 | 4.0 | 1.4 |
| 4.0 | 0.0 | 2.0 |
| 4.0 | -0.4 | 6.3 |
| 4.0 | -2.0 | 9.2 |

| $f_A$ [kHz] | $f_B$ [kHz] | $\theta$ [deg.] |
|---|---|---|
| -2.0 | 4.0 | -32.4 |
| -0.4 | 4.0 | -11.6 |
| 2.0 | 4.0 | -3.8 |
| 4.0 | 4.0 | 3.6 |
| 4.0 | 2.0 | 9.3 |
| 4.0 | -0.4 | 26.3 |
| 4.0 | -2.0 | 34.0 |

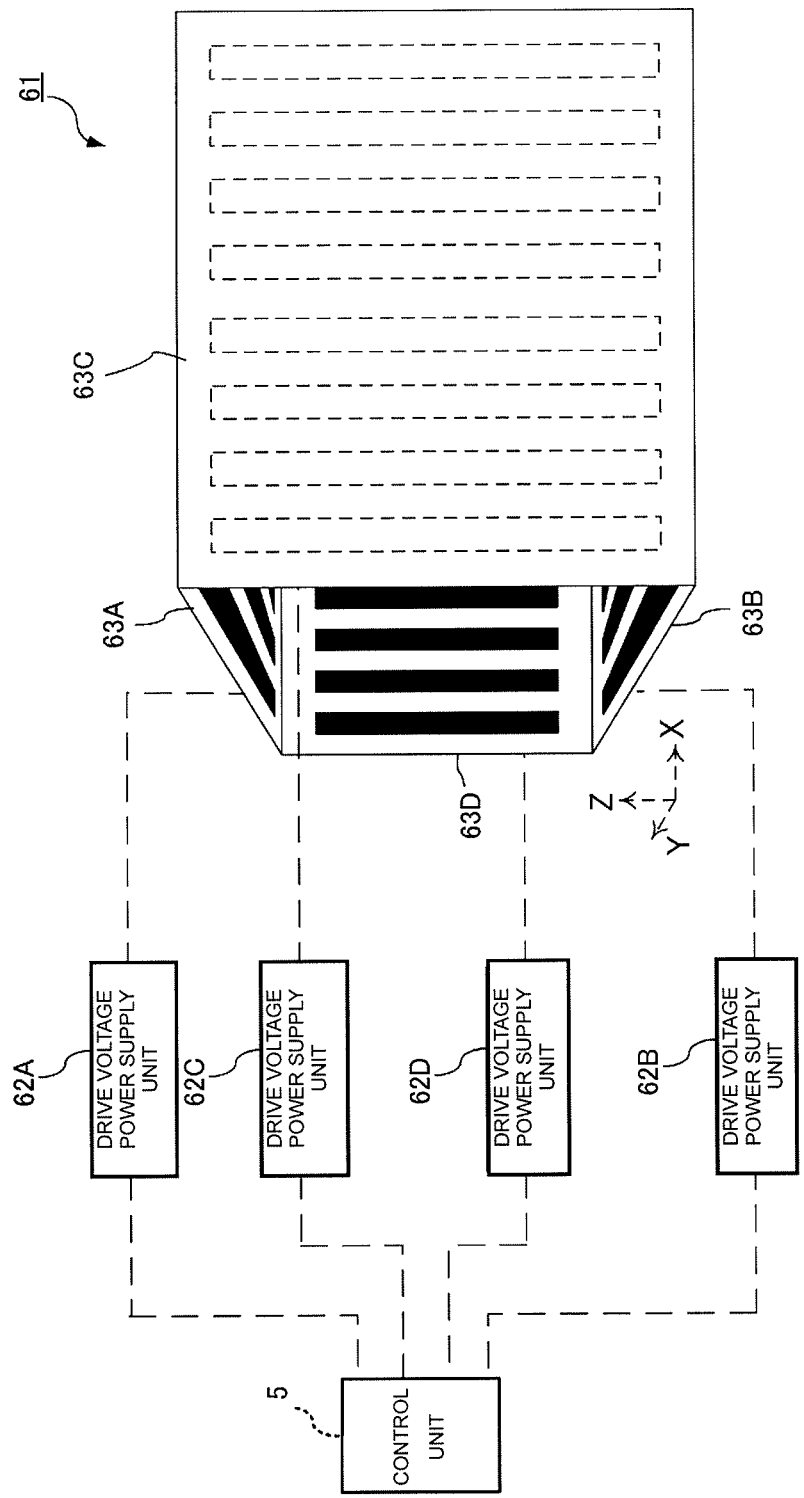

GAS DELIVERY DEVICE AND VEHICLE

CROSS REFERENCE TO RELATED APPLICATIONS

The present application is a continuation of PCT/JP2011/069687 filed Aug. 31, 2011, which claims priority to Japanese Patent Application No. 2011-005835, filed Jan. 14, 2011, the entire contents of each of which are incorporated herein by reference.

FIELD OF THE INVENTION

The present invention relates to a gas delivery device that electrically delivers gas, and a vehicle that notifies a user of information by using the gas delivery device.

BACKGROUND OF THE INVENTION

In related art, gas delivery devices that electrically deliver gas have been devised (see, for example, Patent Document 1). FIG. 1A is a plan view of a gas delivery device 101 based on Patent Document 1. The gas delivery device 101 includes a drive voltage power supply unit 102 and a substrate unit 103. FIG. 1B is a cross-sectional view of the substrate unit 103. The substrate unit 103 includes a dielectric substrate 104, a plurality of linear electrodes 105, and a dielectric film 106. The plurality of linear electrodes 105 are formed and arranged at predetermined intervals in the width direction on the principal surface of the dielectric substrate 104. The dielectric film 106 is formed on the principal surface of the dielectric substrate 104 so as to cover the plurality of linear electrodes 105. As shown in FIG. 1A, in the arrangement of the plurality of linear electrodes 105, every n–th (n is a predetermined positive integer, and n=4 in the illustrated example) linear electrode is connected, and drive voltages $V_1$ to $V_n$ are applied for every n sets of linear electrodes that are connected to each another. FIG. 1C is a waveform chart of the drive voltages $V_1$ to $V_n$. The drive voltages $V_1$ to $V_n$ have a pulse waveform that is periodically repeated, and have a predetermined phase difference from one another.

In the gas delivery device 101, a gradient of electric field is generated in the arrangement direction of the plurality of linear electrodes 105 (X-direction indicated by a broken arrow in FIG. 1A), and gas is delivered by the action of the gradient force near the surface of the dielectric substrate 104. The blowing direction, which is a direction in which gas is mainly delivered, is parallel to the arrangement direction of the linear electrodes 105 when the principal surface of the substrate is seen in plan view as in FIG. 1A, and is also substantially parallel to the principal surface of the substrate (the tilt angle with respect to a reference plane is substantially 0°) when the substrate is seen in side view as in FIG. 1B.

Patent Document 1: Pamphlet of International Publication No. 2008/099569

SUMMARY OF THE INVENTION

According to the configuration of the gas delivery device mentioned above, the blowing direction is uniquely determined by the structure of the device, and it is not possible to direct the gas in an arbitrary direction. Accordingly, an object of the present invention is to provide a gas delivery device that makes it possible to set the tilt angle with respect to the reference plane of the blowing direction to an arbitrary angle.

Another object of the present invention is to realize a vehicle that notifies a user of information by using the gas delivery device.

A gas delivery device according to the present invention includes a first substrate unit, a second substrate unit, and a drive voltage power supply unit. The first substrate unit and the second substrate unit each have a plurality of linear electrodes that are formed and arranged in a width direction on a principal surface of a substrate, and the linear electrodes are electrically connected every predetermined period in an arrangement order. A gap is provided between the first substrate unit and the second substrate unit, and each of the first substrate unit and the second substrate unit is placed so that the principal surface of the substrate faces the gap. A frequency of at least one of a drive voltage applied to the first substrate unit from the drive voltage power supply unit, and a drive voltage applied to the second substrate unit from the drive voltage power supply unit is controlled.

According to this configuration, by controlling the frequency of a drive voltage, the velocity of a gas current generated near the principal surface of the substrate of the substrate unit to which the drive voltage is applied changes. Accordingly, when two substrate units are placed opposite to each other, and the frequency of a drive voltage applied to at least one of the substrate units is controlled, it is possible to control the difference in velocity between gas currents generated near the principal surfaces of the respective substrates of the substrate units, thereby making it possible to control the tilt angle of the blowing direction of a gas current blowing out from the gap.

In the gas delivery device according to the present invention, a drive voltage applied to the first substrate unit from the drive voltage power supply unit, and a drive voltage applied to the second substrate unit from the drive voltage power supply unit are set to different frequencies in advance.

According to this configuration, by placing two substrate units opposite to each other, and setting the frequency of a drive voltage applied to one of the substrate units and the frequency of a drive voltage applied to the other substrate unit to different frequencies, a velocity difference is given to the gas currents generated near the principal surfaces of the respective substrates of the substrate units, thereby making it possible to set the blowing direction to an arbitrary tilt angle.

In the gas delivery device mentioned above, preferably, the first substrate unit and the second substrate unit have the same structure. As a result, the cost of the device can be reduced.

The gas delivery device mentioned above preferably includes a scent generating unit that is provided within the gap, or at a position that communicates with the gap. In addition, preferably, the scent generating unit carries a volatile fragrance and can freely control an amount of volatilization of the volatile fragrance.

While a gas delivery device can be used for an air-cooling application or the like, if the gas delivery device is capable of sophisticated gas current control as in the above-mentioned configuration, the gas delivery device can be used for a variety of applications. For example, in recent years, sensory control techniques for the olfactory sense are being increasingly desired in the technical field related to augmented reality, and gas (scent) flow rate control techniques are gaining importance for purposes such as finely controlling concoction of scent or the like, and controlling the direction from which scent emanates. The configuration according to the present invention enables fine and easy control of the flow rate of scent, and is therefore a promising technique for realizing sensory control for the olfactory sense.

A vehicle according to the present invention includes the above-mentioned gas delivery device that is provided within the vehicle, obstacle detecting means that is provided outside the vehicle, and a control device for outputting a control signal for applying a drive voltage to the gas delivery device, on a basis of the obstacle detecting means. A direction in which the gas delivery device blows on a driver is changed in accordance with at least one of size, direction as viewed from the vehicle, and relative velocity of an obstacle detected by the obstacle detecting means.

The vehicle may include a plurality of the gas delivery devices, and control driving/non-driving of each of the plurality of gas delivery devices on a basis of at least one of size, direction as viewed from the vehicle, and relative velocity of the obstacle detected by the obstacle detecting means, thereby changing the blowing direction with respect to the driver.

In this way, it is possible to notify the user of information related to an obstacle by using not the visual sense or auditory sense but the tactile sense of the user.

According to the present invention, by placing two substrate units opposite to each other, and making the frequencies of drive voltages applied to the respective substrate units differ, it is possible to make the velocities of gas currents generated near the principal surfaces of the respective substrates of the substrate units differ, thereby setting the blowing direction of a gas current blowing out from the gap between the two substrate units to a predetermined tilt angle. Therefore, it is possible to make the frequencies of drive voltages applied to the two substrate units differ in advance to thereby set the tilt angle of the blowing direction to an arbitrary angle in advance, or control the frequencies of the drive voltages to thereby control the tilt angle of the blowing direction.

BRIEF DESCRIPTION OF THE DRAWINGS

FIG. 1A is a plan view illustrating a gas delivery device according to related art.

FIG. 1B is a side view of a substrate unit shown in FIG. 1A.

FIG. 1C is a waveform chart of drive voltages shown in FIG. 1A.

FIG. 2 is a conceptual illustration of a scent delivery device according to a first embodiment of the present invention.

FIG. 7A is a conceptual illustration of a gas delivery device according to a second embodiment of the present invention.

FIG. 8 is a conceptual illustration of a gas delivery device according to a third embodiment of the present invention.

DETAILED DESCRIPTION OF THE PREFERRED EMBODIMENTS OF THE INVENTION

First Embodiment

Figure 3:
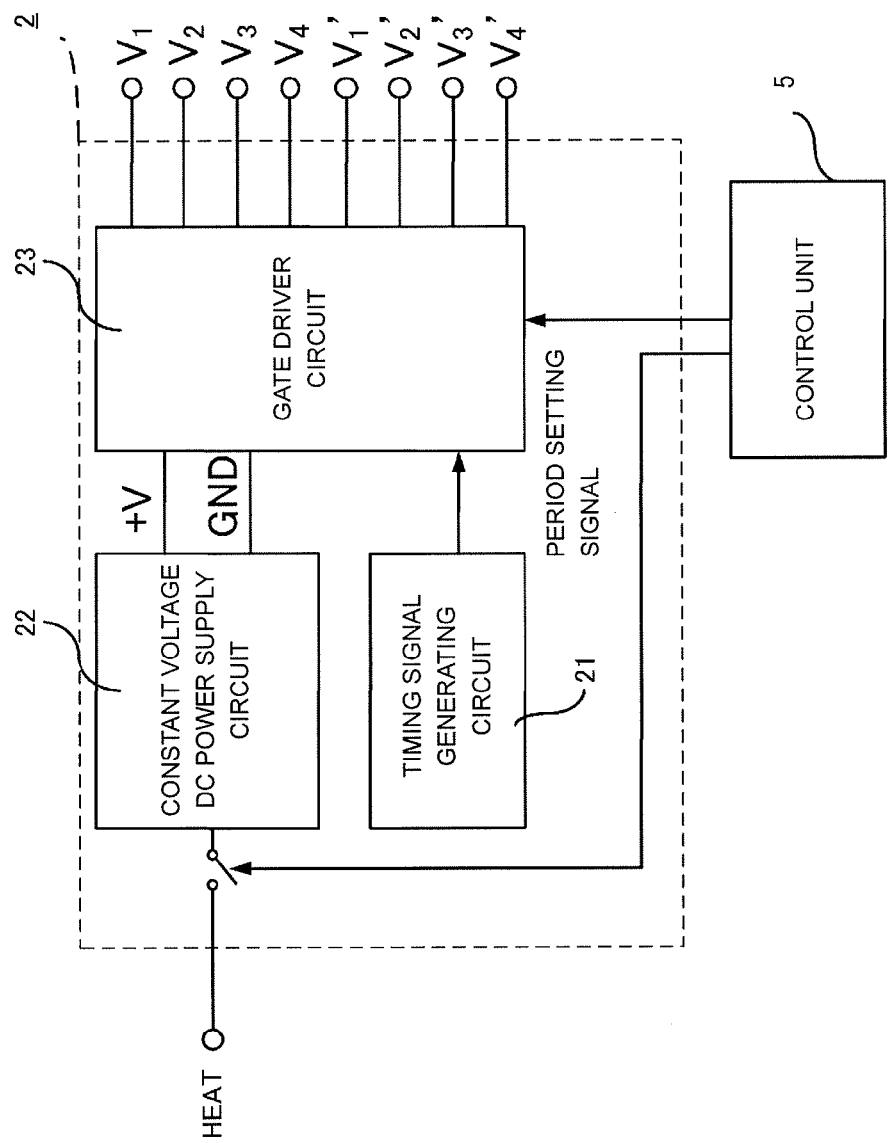
FIG. 3 is a block diagram of a drive voltage power supply unit and a control unit shown in FIG. 2.

Hereinafter, a gas delivery device according to a first embodiment of the present invention will be described with reference to a scent delivery device by way of example.

FIG. 2 is a conceptual illustration of the schematic configuration of a scent delivery device 1 according to the first embodiment.

The scent delivery device 1 includes a drive voltage power supply unit 2, a gas delivery unit 3, a scent generating unit 4, and a control unit 5. The drive voltage power supply unit 2 outputs a drive voltage to each of the gas delivery unit 3 and the scent generating unit 4. The control unit 5 controls the drive voltage outputted by the drive voltage power supply unit 2. The scent generating unit 4 includes a heater 4A and a fragrance carrying unit 4B. The heater 4A generates heat upon application of a drive voltage, and heats the fragrance carrying unit 4B. The fragrance carrying unit 4B carries a volatile fragrance. The amount of volatilization of the fragrance changes as the fragrance carrying unit 4B is heated from the heater 4A.

The gas delivery unit 3 includes a first substrate unit 3A and a second substrate unit 3B. The substrate units 3A and 3B are placed in parallel so that the principal surfaces of their respective substrates are opposite to each other with a predetermined distance. Although detailed configuration of the substrate units 3A and 3B will be described later, each of the substrate units 3A and 3B includes linear electrodes that are extended in a direction perpendicular to the plane of FIG. 2. A drive voltage is applied in a periodic waveform pattern and with a predetermined phase difference to each of the linear electrodes. Controlling the period (frequency) of the drive voltage makes it possible to adjust the velocity of a gas current (see, for example, the solid arrow illustrated in the drawing) generated near the principal surface of each of the substrates. Therefore, it is possible for the gas delivery unit 3 to make the velocities of gas currents generated near the principal surfaces of the respective substrates of the substrate units 3A and 3B differ. As a result, for a gas current blowing out from the gap between the substrate unit 3A and the substrate unit 3B, it is possible to control the tilt angle of its blowing direction with reference to the plane parallel to the principal surfaces of the substrates and passing through the center of the gap, or its flow rate.

Therefore, by driving the gas delivery unit 3 while driving the heater 4A, the scent delivery device 1 can blow a gas current (scent) containing fragrance molecules volatilized from the fragrance carrying unit 4B, in a blowing direction that is controlled to an arbitrary tilt angle.

The velocity of a gas current generated near the principal surface of the substrate of each of the substrate units 3A and 3B is low in the substrate unit applied with a low frequency, and is high in the substrate unit applied with a high frequency. Therefore, the gas current blowing out from the gas delivery unit 3 bends toward the substrate unit that is applied with a low frequency.

In addition, the air delivery device 3 can generate a gas current as a jet, thereby reducing diffusion of the gas current blowing out from the gap. Therefore, according to the scent delivery device 1, scent can be reliably blown in an arbitrary direction.

Hereinafter, the configurations of the drive voltage power supply unit 2 and gas delivery unit 3, and drive voltages will be described in more detail.

FIG. 3 is a block diagram showing an example of the block configurations of the drive voltage power supply unit 2 and control unit 5.

The drive voltage power supply unit 2 includes a timing signal generating circuit 21, a constant voltage DC power supply circuit 22, and a gate driver circuit 23. The timing signal generating circuit 21 applies a timing signal to the gate driver circuit 23. The constant voltage DC power supply circuit 22 applies a ground potential and a +V-volt voltage to the gate driver circuit 23. The gate driver circuit 23 is, for example, a logic circuit formed by a combination of a plurality of elements such as power MOS FETs. The gate driver circuit 23 switches between the ground potential and the +V volt at a specific timing synchronized with the timing signal. The gate driver circuit 23 generates drive voltages $V_n$ and $V_n'$ (n=1, 2, 3, or 4 in this example) by repeating the above-mentioned switching periodically. The drive voltage $V_n$ is applied to the substrate unit 3A mentioned above, and the drive voltage $V_n'$ is applied to the substrate unit 3B mentioned above.

The gate driver circuit 23 is capable of switching the ratio between the repeating periods of the drive voltages $V_n$ and $V_n'$ to 1:2, 1:1, 2:1, or the like, by means of a period setting signal inputted from the control unit 5. Controlling the periods of the drive voltages in this way enables control of the blowing direction (control of the tilt angle) in the gas delivery unit 3 mentioned above, such as bending the blowing direction toward the substrate unit 3A or conversely bending the blowing direction toward the substrate unit 3B, or causing the gas flow to blow out as it is without bending of its blowing direction.

The drive voltage power supply unit 2 is also configured to switch the output state of a heater driving voltage outputted by the constant voltage DC power supply circuit 22 by means of control from the control unit 5, thereby also controlling generation of scent by the scent generating unit 4 mentioned above.

Figure 4A:
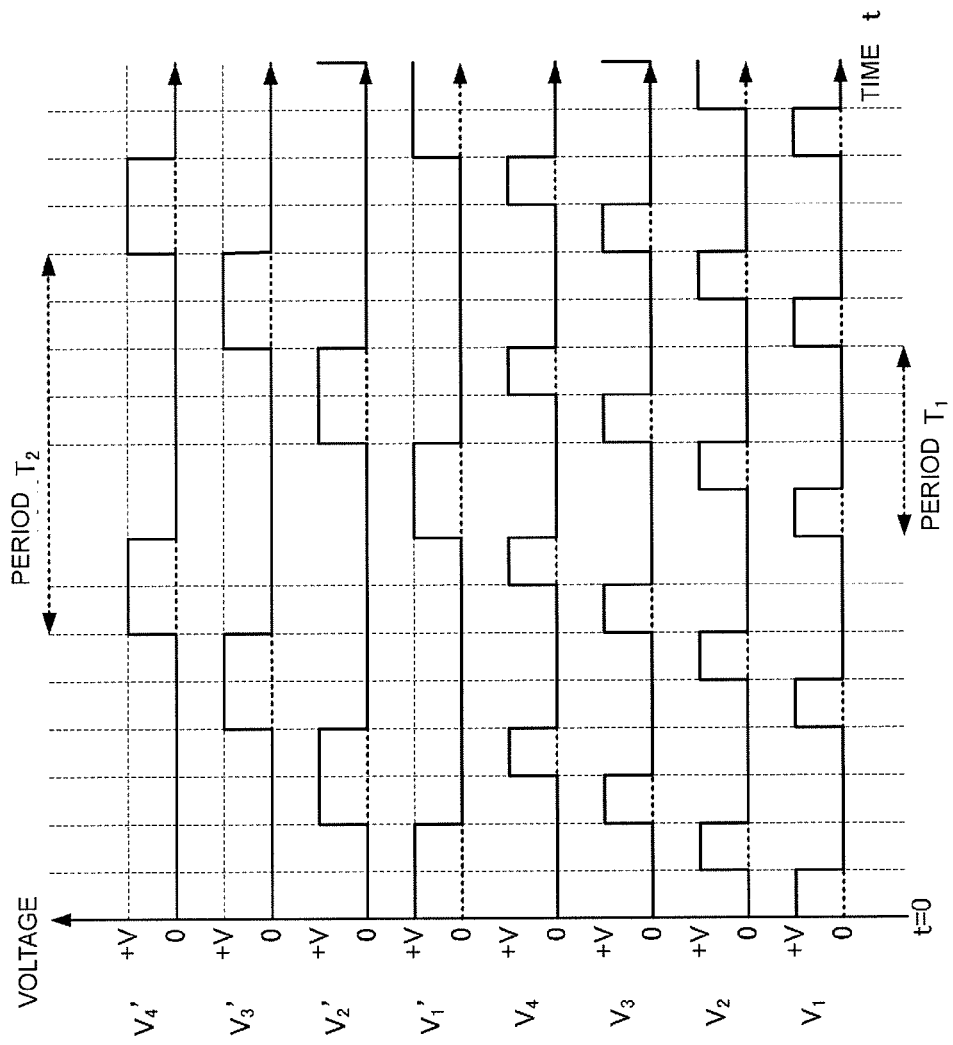
FIG. 4A is a waveform chart of drive voltages shown in FIG. 3.

FIG. 4A is a waveform chart illustrating the waveforms of drive voltages $V_i$ and $V_i'$.

In this example, for the drive voltage $V_n$, a unit waveform is repeated in a period $T_1$ (n clocks, that is, four clocks in the illustrated example). The unit waveform is a pulse waveform that takes on the following values between time t=0 and t=$T_1$:

$$+V\{(T_1/4)\times(n-1)<t<(T_1/4)\times(n-1)+\tau_w\}$$

$$0\{\text{when } t \text{ is other than above}\},$$

where $\{0<\tau_w \le T_1/4\}$.

For the drive voltage $V_n'$, a unit waveform is repeated in a period $T_2$ (2n clocks, that is, eight clocks in the illustrated example). The unit waveform is a pulse waveform that takes on the following values between time t=0 and t=$T_2$:

$$+V\{(T_2/4)\times(n-1)<t<(T_2/4)\times(n-1)+\tau'_w\}$$

$$0\{\text{when } t \text{ is other than above}\},$$

where $\{0<\tau'_w, T_2/4\}$.

In this way, each of the drive voltages $V_n$ and $V_n'$ has such a waveform that every two adjacent phases are shifted in phase by a 1/n period, and that the voltage becomes +V volt in only one phase and the voltage does not become +V volt simultaneously in two or more phases.

Figure 4B:
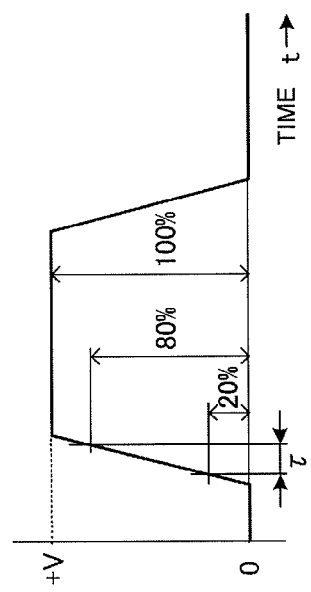
FIG. 4B illustrates the rising time of a pulse waveform shown in FIG. 4A.

FIG. 4B illustrates the rising time of the pulse waveform. When the rising time τ is defined as the time in which the voltage reaches 80% of the peak voltage +V from 20%, it is preferable to set the rising time τ so as to be equal to or less than 1 μs.

Figure 5A:
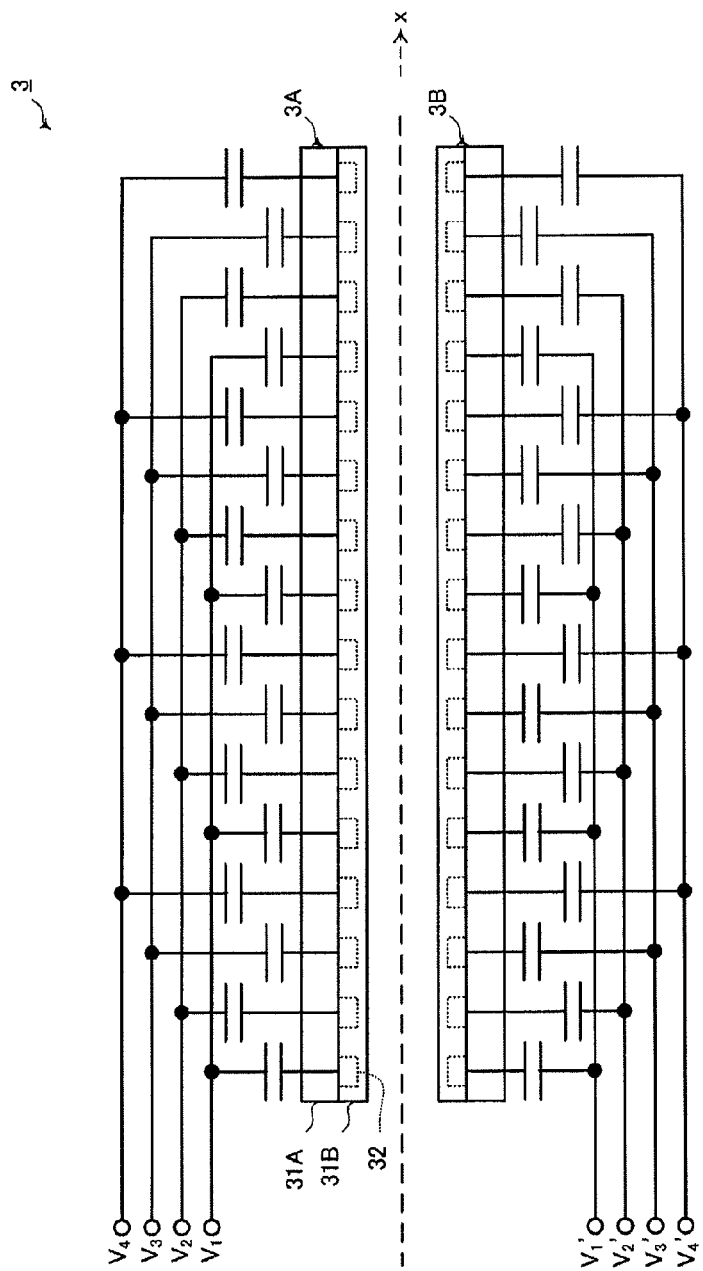
FIG. 5A is a side view illustrating the connection between a gas delivery unit shown in FIG. 2 and signal input ports.

FIG. 5A is a side view illustrating the connection of the gas delivery unit 3 to signal input ports to which the drive voltages $V_n$ and $V_n'$ are applied. In the gas delivery unit 3, the substrate unit 3A and the substrate unit 3B are placed so as to be symmetrical with respect to the reference plane indicated by a broken line in FIG. 5A.

The substrate units 3A and 3B have the same configuration. Each of the substrate units 3A and 3B includes a dielectric substrate 31A, a plurality of linear electrodes 32, and a dielectric film 31B. In addition, the connections from the respective linear electrodes 32 of the substrate units 3A and 3B to the corresponding signal input ports are also symmetrical with respect to the reference plane indicated by the broken line in FIG. 5A.

Figure 5B:
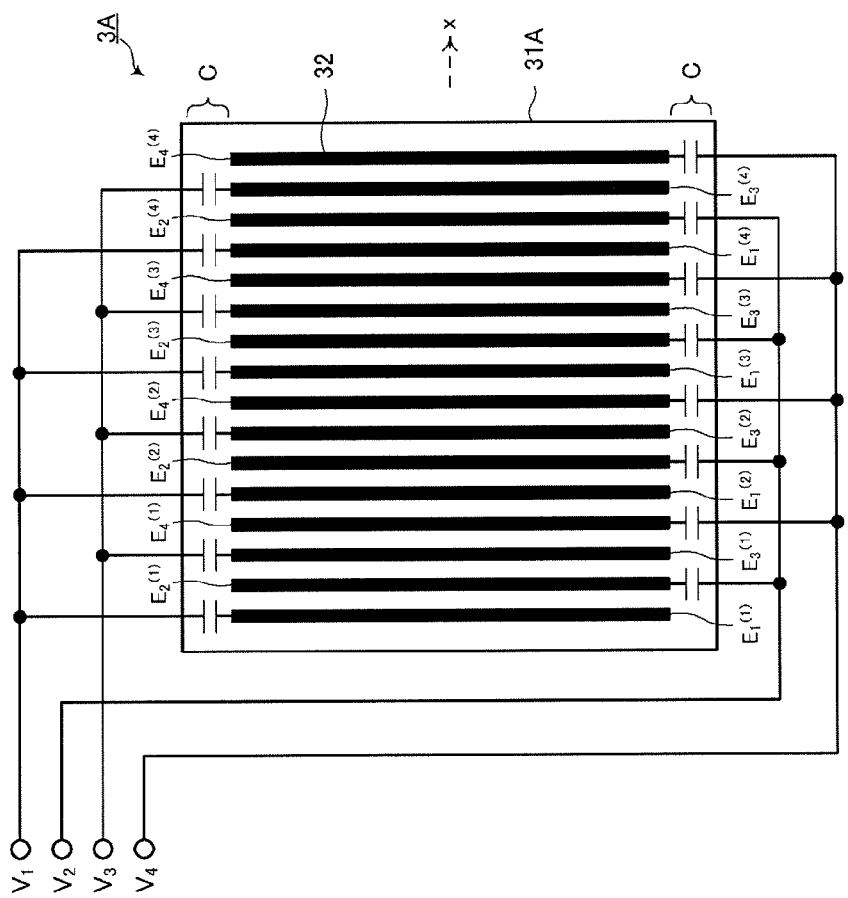
FIG. 5B is a plan view illustrating the connection between a substrate unit shown in FIG. 5A and signal input ports.

FIG. 5B is a plan view of the substrate unit 3A, for explaining its connection to signal input ports. Since the substrate unit 3B is of the same structure as the substrate unit 3A, a description of the substrate unit 3B is omitted. In FIG. 5B, each individual linear electrode is denoted by a symbol $E_i^{(j)}$ indicating that the corresponding linear electrode 32 is the j-th linear electrode placed along the direction of gas current, among a set of linear electrodes 32 that are applied with a drive voltage of the i-th phase.

The plurality of linear electrodes $E_i^{(j)}$ provided in the substrate unit 3A are formed and arranged in parallel and at fixed intervals on the upper surface of the dielectric substrate 31A. Every n(=4)-th linear electrode of the plurality of linear electrodes $E_i^{(j)}$ in their arrangement order is connected together, and one of drive voltages $V_n$ ($V_1$ to $V_4$) in n(=4) phases is applied to each set of these connected linear electrodes.

The direction in which the end portion of each of the linear electrodes $E_i^{(j)}$ connected to the signal input port is drawn is switched alternately between odd-numbered electrodes ($E_1^{(j)}$ and $E_3^{(j)}$) and even-numbered electrodes ($E_2^{(j)}$ and $E_4^{(j)}$). Further, the end portion of each of the linear electrodes $E_i^{(j)}$ which is connected to the signal input port is connected with an added capacitor C, and is applied with the drive voltage $V_n$ via the added capacitor C. Although the added capacitor C is not an essential component in the present invention, the added capacitor C is provided for the purpose of preventing spark discharge from occurring between the linear electrodes to thereby prevent the electrodes or the insulating film near the electrodes from breaking.

Figure 5C:
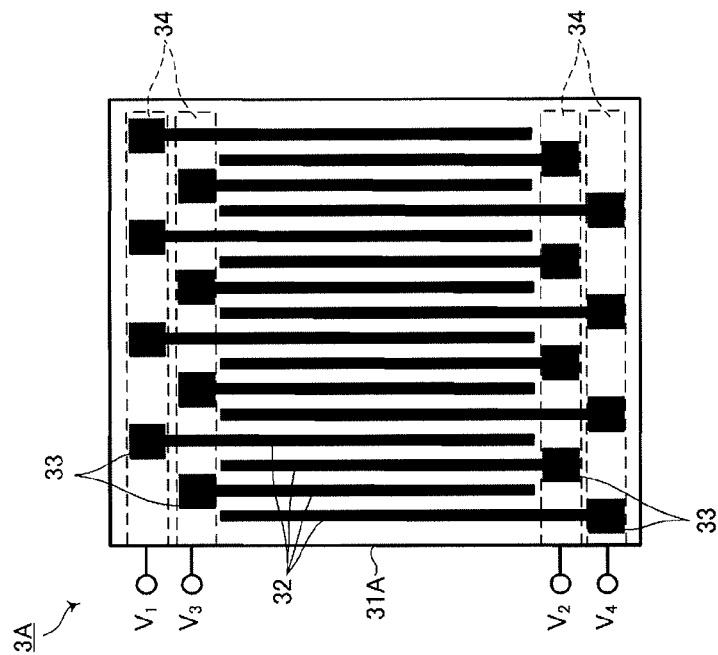
FIG. 5C is a plan view illustrating an example of the specific configuration of the substrate unit shown in FIG. 5B.

FIG. 5C shows an example of the specific configuration of the added capacitor C.

In this example, the added capacitor C includes the dielectric substrate 31A, first counter electrodes 33 provided at respective end portions of the linear electrodes 32, and second counter electrodes 34 that are provided on the back surface of the dielectric substrate 31A and are opposite to the counter electrodes 33 with the dielectric substrate 31A therebetween. Of all the counter electrodes 33, the counter electrodes 33 connected to the linear electrodes ($E_1^{(j)}$, $E_2^{(j)}$, $E_3^{(j)}$, and $E_4^{(j)}$) constituting a set are all placed opposite to one of the counter electrodes 34 that are provided in four rows in the form of lines. Each of drive voltages $V_1$ to $V_4$ is applied to the corresponding one of the four rows of counter electrodes 34. The added capacitor C can be configured in this way.

Next, the operational mechanism for gas delivery by the substrate unit 3A will be described. The operational mechanism for gas delivery by the substrate unit 3B is also the same.

While the mechanism as to why a gas current occurs in the gas delivery unit 3 has not been sufficiently elucidated yet, it is assumed that the following processes (actions) (a) to (d) are involved in the mechanism.

(a) As the electric field between electrodes abruptly increases at the rising of each pulse voltage, an electrical discharge occurs within the gas. This electrical discharge causes ionization of gas molecules between the electrodes, creating charged particles.

(b) The charged particles derived from (a) and (d) are subject to a force due to the electric field, and accelerated along the direction of the electric field.

(c) The accelerated charged particles collide with other non-ionized gas molecules, imparting a momentum to the gas molecules.

(d) The charged particles deposit on the insulating coating near the electrodes.

A supplementary description will be given of this operational mechanism below with reference to the drawings.

Figure 6A:
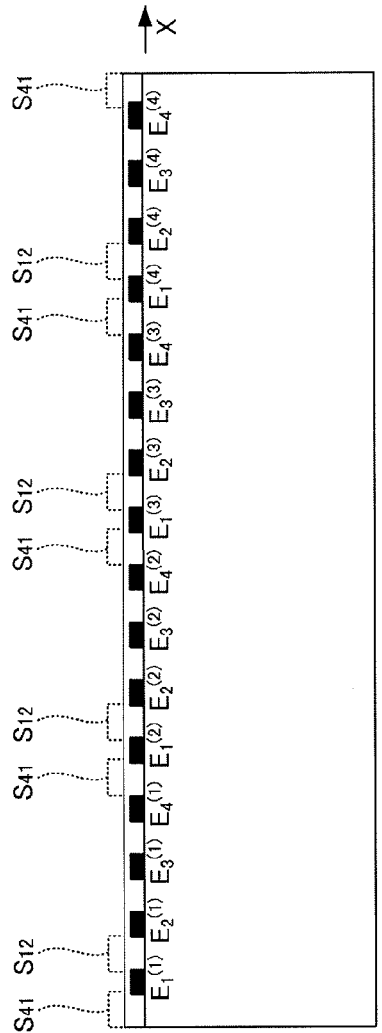
FIG. 6A is an illustration of regions adjacent to linear electrodes, which is used for explaining the operational mechanism of gas delivery by a substrate unit.

FIG. 6A is a cross-sectional view of the substrate unit 3A showing a region $S_{12}$ and a region $S_{41}$ that are adjacent to the linear electrode $E_1^{(j)}$. The region $S_{12}$ is a region on the insulating film between the linear electrode $E_1^{(j)}$ and the linear electrode $E_2^{(j)}$, and the region $S_{41}$ is a region on the insulating film between the linear electrode $E_4^{(j-1)}$ and the linear electrode $E_1^{(j)}$. Although not shown, the region $S_{23}$ is a region on the insulating film between the linear electrode $E_2^{(j)}$ and the linear electrode $E_3^{(j)}$, and the region $S_{34}$ is a region on the insulating film between the linear electrode $E_3^{(j)}$ and the linear electrode $E_4^{(j)}$.

Figure 6B:
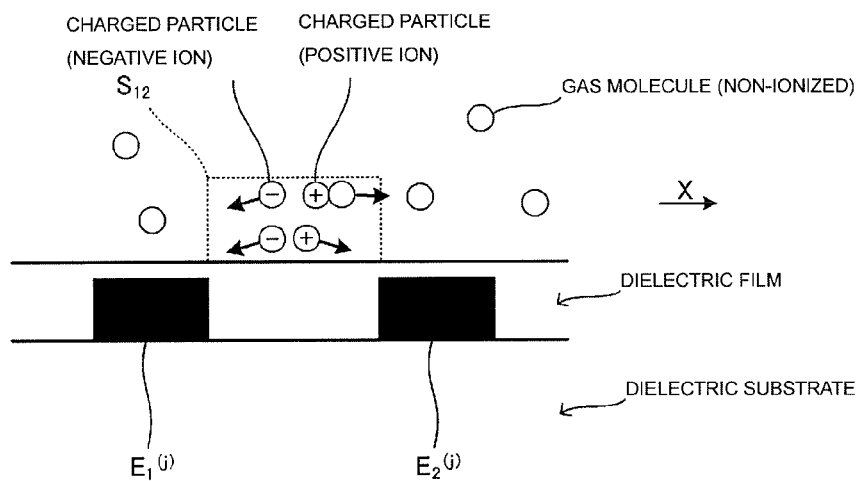
FIG. 6B is an illustration of movements of charged particles and gas molecules in the regions shown in FIG. 6A.
Figure 6C:
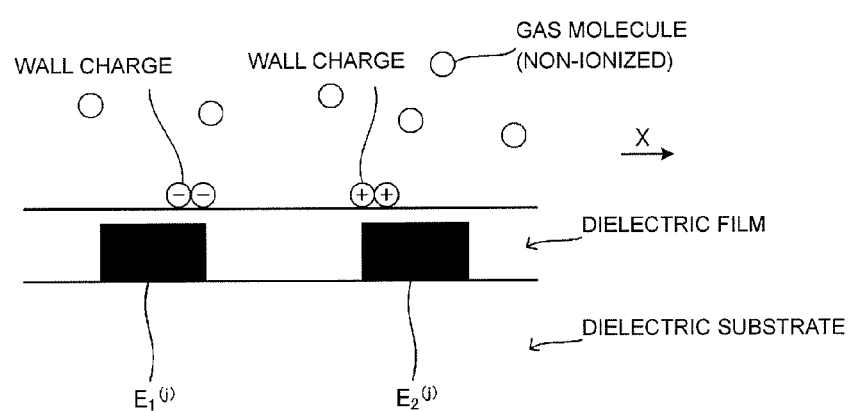
FIG. 6C is an illustration, continuous from FIG. 6B, of movements of charged particles and gas molecules.

FIGS. 6B and 6C each show movements of charged particles and gas molecules with respect to the region $S_{12}$.

It is considered that in the process (a) mentioned above, in the rising period of the drive voltage $V_1$ in the linear electrode $E_1^{(j)}$, the electric field rapidly increases in the regions $S_{41}$ and $S_{12}$ adjacent to the linear electrode $E_1^{(j)}$, causing dielectric barrier discharge. Dielectric barrier discharge is an electrical discharge that occurs when electrodes (linear electrodes) are coated with a dielectric (dielectric film).

It is considered that in the processes (b) and (c) mentioned above, the charged particles generated by the dielectric barrier discharge are accelerated by the Coulomb force induced by the electric field as schematically shown in FIG. 6B, move toward the linear electrodes, and collides with non-ionized gas molecules. The gas is delivered as the momentum transfers from the charged particles to the gas molecules owing to this collision. At this time, in a case where the gas to be delivered is air, each of the charged particles is considered to include mainly a single positive ion and an electron produced by ionization of a nitrogen molecule in the air.

It is considered that in the process (d) mentioned above, although the charged particles are attracted toward the linear electrodes as schematically shown in FIG. 6C, because the linear electrodes are coated with a dielectric film, the charged particles cannot reach the linear electrodes, and deposit and remain on the insulating film in the vicinity of the linear electrodes. The charged particles that have deposited (wall charges) create an electric field in a direction opposite to the electric field created by the linear electrodes. Once a predetermined amount of charged particles has been generated and deposited, the electric field between the electrodes becomes sufficiently small, causing the electrical discharge (dielectric barrier discharge) to stop. Therefore, the electrical discharge stops in a very short time. For this reason, normally, the electric discharge does not lead to a destructive electrical discharge such as arc discharge, and also the amount of generated charge is limited to a predetermined amount.

In the above description, whether the gas is delivered in the +x direction or −x direction is not determined. It is considered, however, that in actuality, an asymmetry develops with respect to the +x direction and the −x direction in at least one of the processes (a) to (d) mentioned above, producing a flow in one direction. According to an experiment, the direction of this flow was the +x direction in many cases.

According to the scent delivery device 1 according to the first embodiment, the operational mechanism mentioned above causes gas currents to occur near the principal surfaces of the respective substrates of the substrate units 3A and 3B. Moreover, the velocities of those gas currents are determined in accordance with the frequencies of drive voltages described above with reference to FIG. 4A. Accordingly, by switching the ratio between the periods (frequencies) of respective drive voltages applied to the substrate units 3A and 3B, it is possible to control the velocity ratio or blowing direction of gas currents generated near the principal surfaces of the respective substrates of the substrate units 3A and 3B.

While the first embodiment is directed to the case where the number of phases n of the drive voltage is n=4, the number may be any integer not smaller than three. In addition, while the first embodiment is directed to the case where the number of sets of linear electrodes is four, in actuality, it is practical to set a value that is several to several hundred times this number. In addition, while the first embodiment is directed to the case where the ratio of the respective periods of the drive voltages $V_n$ and $V_n'$ is switched between 2:1, 1:1, and 1:2, it is preferable to increase discreteness to enable more fine setting of the period ratio. This also enables fine setting of the tilt angle of the blowing direction.

While the first embodiment is directed to the case where the drive voltages $V_n$ and $V_n'$ are generated by a single drive voltage power supply unit 2, the drive voltages $V_n$ and $V_n'$ may be generated by different drive voltage power supply units. In addition, while the first embodiment is directed to the case where each of the substrate units 3A and 3B is provided with the added capacitor C, the added capacitor C may be omitted. In that case, it is unnecessary to adopt the complex electrode structure as shown in FIG. 5C, and the structure of the device can be simplified. Moreover, the specific configuration of the added capacitor C is not limited to that of the example shown in FIG. 5C but any configuration may be adopted.

In addition, the operational mechanism for gas delivery and drive method with respect to each of the substrate units are not limited to those mentioned above but any operational mechanism and drive method may be adopted.

Second Embodiment

Next, a gas delivery device according to a second embodiment of the present invention will be described. In the drawings used in the following description, constituent elements that are similar in configuration and function to those described above are denoted by the same reference signs, and a detailed description of those constituent elements is omitted sometimes.

FIG. 7A is a conceptual illustration of a gas delivery device 51 according to the second embodiment. The gas delivery device 51 includes a drive voltage power supply unit 52, substrate units 53A and 53B, and the control unit 5. In this example, the substrate units 53A and 53B are not in parallel but are placed inclined to each other so that their suction-side end portions are spaced apart from each other and their exhaust-side end portions become close to each other.

Figure 7B:
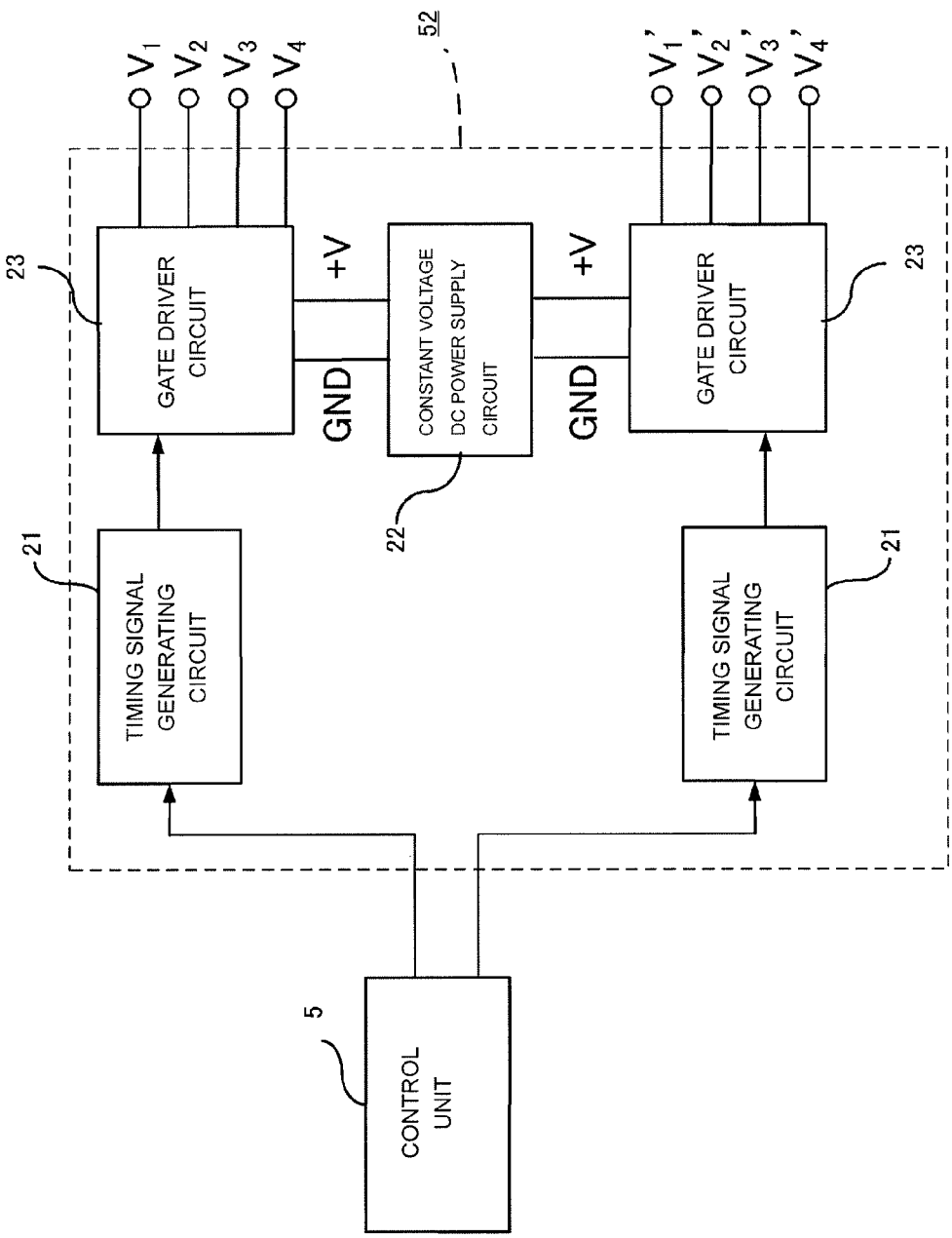
FIG. 7B is a block diagram of a drive voltage power supply unit and a control unit shown in FIG. 7A.

FIG. 7B is a block diagram showing an example of the block configurations of the drive voltage power supply unit 52 and control unit 5.

In this example, the drive voltage power supply unit 52 is provided with two sets of timing signal generating circuits 21 and gate driver circuits 23, and drive voltages $V_n$ and $V_n'$ are generated so as to be isolated from each other. The control unit 5 generates a control signal that controls each of the two timing signal generating circuits 21, and each of the timing signal generating circuits 21 finely adjusts the output period of a timing signal in accordance with the control signal. This configuration makes it possible to finely adjust the respective periods of the drive voltages $V_n$ and $V_n'$. This configuration of the drive voltage power supply unit 52 can be also adopted for the scent delivery device 1 according to the first embodiment.

Figure 7C:
FIG. 7C illustrates the results of an experiment using an example in which two substrate units are placed inclined to each other and an example in which the two substrate units are placed in parallel to each other.

Now, the results of a comparative experiment conducted with respect to an example in which the two substrate units are placed inclined to each other as in the second embodiment, and an example in which the two substrate units are placed in parallel as in the first embodiment will be described. FIG. 7C illustrates the results of the experiment.

In the experiment, changes in the tilt angle θ of the blowing direction were observed while varying the combination of the frequencies ($f_A$ and $f_B$) of drive voltages applied to the two substrate units. The observation of the blowing direction was performed by analyzing a moving image obtained by capturing the motion of smoke generated by the smoke wire method with a high speed camera.

In the example in which the two substrate units are placed inclined to each other, the angle formed by the two substrate units is set as 45°, and the plane at 22.5° from each of the substrate units is defined as a reference plane at which the tilt angle θ is 0°. In the example in which the two substrate units are placed in parallel to each other, the plane equidistant from the two substrate units is defined as a reference plane.

The observation results for the example in which the two substrate units are placed in parallel to each other are shown in the table on the right-hand side of FIG. 7C. The observation results for the example in which the two substrate units are placed inclined to each other are shown in the table on the left-hand side of FIG. 7C.

As is apparent from each of the tables, in both of the example in which the two substrate units are placed in parallel to each other and the example in which the two substrate units are placed inclined to each other, it was possible to change the tilt angle θ of the blowing direction by changing the combination of the frequencies ($f_A$ and $f_B$).

While negative values are indicated as frequencies, this means that the phase sequence in which voltage is applied is reverse.

In the example in which the two substrate units are placed in parallel to each other, the range of the tilt angle θ of the blowing direction from the maximum value to the minimum value was about 17.2°, whereas in the example in which the two substrate units are placed inclined to each other, the range of the tilt angle θ of the blowing direction from the maximum value to the minimum value was extremely large at about 66.4°. Therefore, it is considered that although the thickness of the device increases in comparison to the parallel placement, the configuration in which the two substrate units are placed inclined to each other is suitably adopted for applications in which it is required to control the tilt angle θ of the blowing direction over a wide range.

Third Embodiment

Next, a gas delivery device according to a third embodiment of the present invention will be described.

FIG. 8 is a conceptual illustration of a gas delivery device 61 according to the third embodiment.

The gas delivery device 61 includes substrate units 63A, 63B, 63C, and 63D that are combined in a tube-like fashion. The substrate units 63A and 63B are placed on the upper side in the vertical direction (Z-axis direction) and on the lower side in the vertical direction (Z-axis direction), respectively. The substrate units 63C and 63D are placed on the right foreground side in the horizontal direction (Y-axis direction) and on the left background side in the horizontal direction (Y-axis direction), respectively.

The gas delivery device 61 also includes drive voltage power supply units 62A, 62B, 62C, and 62D corresponding to the substrate units 63A, 63B, 63C, and 63D, respectively, and the control unit 5 that controls those drive voltage power supply units in a centralized manner. The drive voltage power supply units 62A, 62B, 62C, and 62D apply drive voltages of n phases to the substrate units 63A, 63B, 63C, and 63D, respectively. The control unit 5 instructs each of the drive voltage power supply units 62A, 62B, 62C, and 62D to set the frequency of the drive voltage, thereby causing the frequency of the drive voltage to be changed.

The gas delivery device 61 according to the third embodiment makes it possible to control the tilt angle in the vertical direction with reference to the horizontal plane (X-Y plane), by controlling the frequencies of drive voltages applied to the substrate units 63A and 63B. In addition, the gas delivery device 61 makes it possible to control the tilt angle in the horizontal direction with reference to the vertical plane (X-Z plane), by controlling the frequencies of drive voltages applied to the substrate units 63C and 63D.

Specifically, it is possible to blow a gas current to an arbitrary position by setting the frequencies as follows. In the case of blowing to a position expressed as:

(X, Y, Z)=(sin θ·cos φ, sin θ·sin φ, cos θ)

in the orthogonal coordinate system with the center position of the gas current outlet taken as a reference point, the frequencies $f_A$ to $f_D$ of drive voltages applied to the substrate units 63A to 63D may be set as follows:

$f_A=f_0·(1-b·\cos θ)$ $f_B=f_0·(1+b·\cos θ)$ $f_C=f_0·(1-b·\sin θ·\cos φ)$ $f_D=f_0·(1+b·\sin θ·\cos φ)$, where "b" mentioned above is a positive real number, for which an optimum value is determined as appropriate.

By setting $f_0$ mentioned above to an appropriate frequency, the blowing direction can be directed to the position in the orthogonal coordinate system described above.

Fourth Embodiment

Next, a gas delivery device according to a fourth embodiment of the present invention will be described. The gas delivery device according to the fourth embodiment includes a drive voltage power supply unit 72 having a configuration different from that in the first embodiment.

Figure 9:
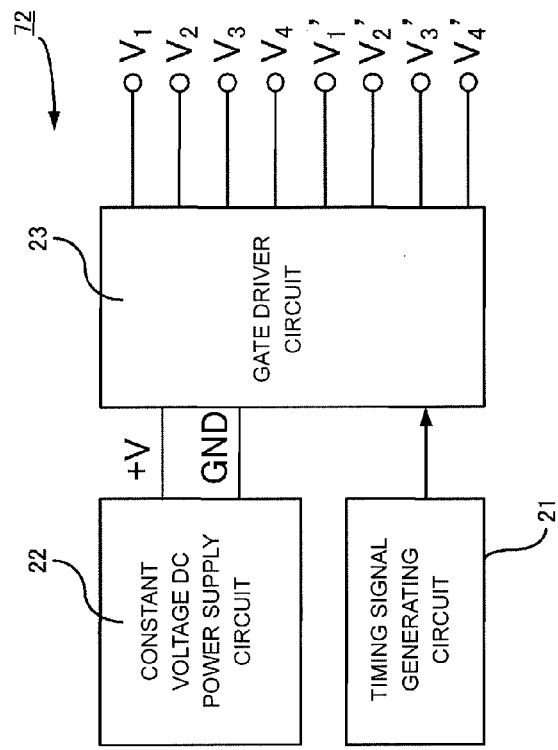
FIG. 9 is a block diagram of a drive voltage power supply unit provided in a gas delivery device according to a fourth embodiment of the present invention.

FIG. 9 is a block diagram showing an example of the configuration of the drive voltage power supply unit 72.

The configuration of the drive voltage power supply unit 72 is such that the control unit and the output system for a heater control voltage are omitted from the configuration of the drive voltage power supply unit 2 according to the first embodiment. Although the drive voltage power supply unit 72 configured in this way is not able to control the tilt angle of the blowing direction, by setting the periods of the drive voltages $V_n$ and $V_n'$ to different values in advance, the tilt angle of the blowing direction can be set to an arbitrary angle in advance.

While the present invention can be practiced as in the above-mentioned embodiments, the scope of the present invention is defined not by the above embodiments but by the appended claims, and is intended to cover all modifications and equivalents that fall within the scope of the appended claims.

An automobile is conceivable as an example of use of the gas delivery device according to each of the first to fourth embodiments.

Figure 10:
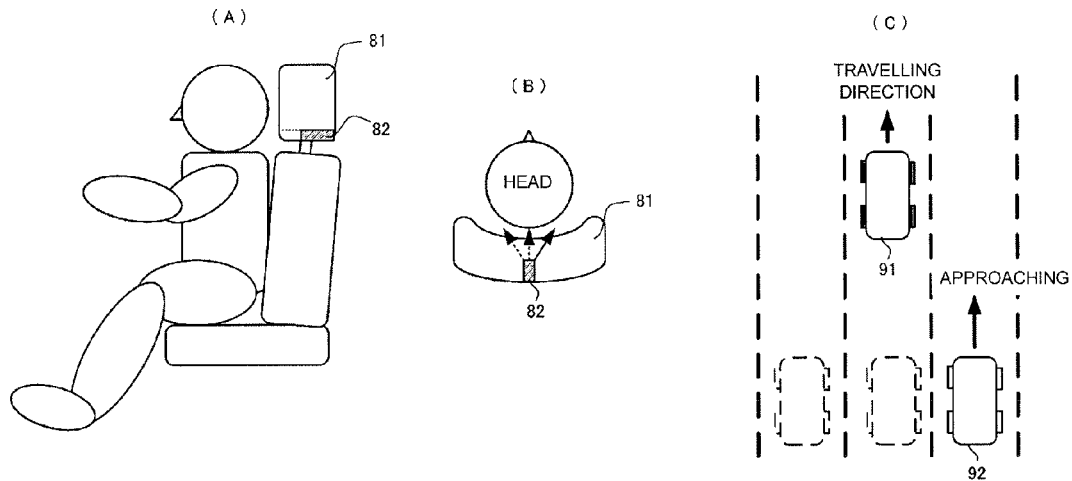
FIG. 10 illustrates a schematic configuration of a vehicle according to an example of the present invention.

FIG. 10(A) shows a driver's seat as viewed from the side, and FIG. 10(B) shows the driver's seat as viewed from above. A headrest 81 equipped to the driver's seat is provided with a gas delivery device 82 having the same configuration as that described above with reference to any one of the first to fourth embodiments. FIG. 10(C) shows the positional relationship between a vehicle 91 installed with the air delivery device 82, and another vehicle 92 running alongside behind the vehicle 91. The vehicle 91 has obstacle detecting means (not shown) such as a radar or an ultrasonic sensor provided outside the vehicle. The obstacle detecting means detects the presence of the other vehicle 92 or a pedestrian approaching from behind, or other such obstacle. The vehicle 91 also includes a control unit (not shown) that controls the frequency of a drive voltage applied to the gas delivery device 82, on the basis of a detection signal from the obstacle detecting means. The control unit changes the direction and amount of gas current blown to the driver, in accordance with the size of the other vehicle 92, the direction of the other vehicle 92 as seen from the vehicle 91, the relative velocity of the other vehicle 92 with respect to the vehicle 91, and the like detected by the obstacle detecting means. Consequently, it is possible to notify the driver of information related to the approaching state of the other vehicle 92, by means of tactile sensation.

Figure 11:
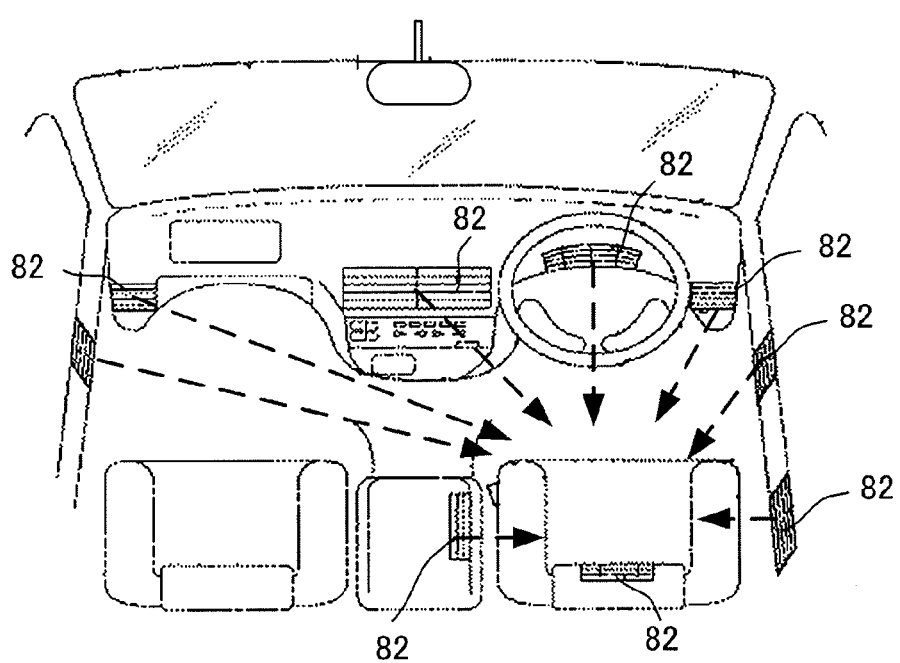
FIG. 11 illustrates another schematic configuration of a vehicle according to an example of the present invention.

For obstacles approaching from the front or the side, for example, as shown in FIG. 11, it is also possible to provide the driver with similar notification of information by installing a plurality of gas delivery devices 82 in a plurality of locations inside the vehicle, and controlling driving/non-driving of the gas delivery devices 82, or by combining the directions and amounts of gas currents from the gas delivery devices 82.

REFERENCE SIGNS LIST

1 scent delivery device
2, 52, 72 drive voltage power supply unit
2 gas delivery unit
3A, 3B substrate unit
4 scent generating unit
4A heater
4B fragrance carrying unit
5 control unit
21 timing signal generating circuit
22 constant voltage DC power supply circuit
23 gate driver circuit
31A dielectric substrate
31B dielectric film
32 linear electrode
33, 34 counter electrode
51, 61, 82 gas delivery device
81 headrest
91 vehicle
92 another vehicle

The invention claimed is:

1. A gas delivery device comprising:
a first substrate unit and a second substrate unit, the first substrate unit and the second substrate unit each having a plurality of linear electrodes disposed on a principal surface of a substrate in a width direction and being electrically connected in a predetermined period in an arrangement order; and
a drive voltage power supply unit configured to apply respective drive voltages with repeating patterns to the linear electrodes of each of the substrate units, the respective drive voltages with repeating patterns having a predetermined phase difference,
wherein a gap is provided between the first substrate unit and the second substrate unit, and the principal surface of the substrate of each of the first substrate unit and the second substrate unit faces the gap, and
wherein a frequency of at least one of the respective drive voltages applied to the first substrate unit and the second substrate unit is controlled.

2. The gas delivery device according to claim 1, wherein the first substrate unit and the second substrate unit have the same structure.

3. The gas delivery device according to claim 1, further comprising a scent generating unit configured to provide a volatile fragrance.

4. The gas delivery device according to claim 3, wherein the scent generating unit is disposed in the gap or in a gas flow passage that communicates with the gap.

5. The gas delivery device according to claim 3, wherein the scent generating unit is configured to control an amount of volatilization of the volatile fragrance.

6. The gas delivery device according to claim 1, wherein the first substrate unit and the second substrate unit are disposed in parallel to each other.

7. The gas delivery device according to claim 1,
wherein the first substrate unit and the second substrate unit each have a suction-side end portion and an exhaust-side end portion, and
wherein the first substrate unit and the second substrate unit are disposed at an inclined position with respect to each other, such that the respective exhaust-side end portions are closer in distance than the respective suction-side end portions.

8. The gas delivery device according to claim 1, further comprising a gate driver circuit configured to switch the ratios between the repeating patterns of the respective drive voltages to control a blowing direction of the gas delivery unit.

9. A vehicle comprising:
the gas delivery device according to claim 1 disposed within the vehicle;
an obstacle detecting unit disposed outside the vehicle that is configured to detect an obstacle; and
a control unit configured to output a control signal to supply the respective drive voltages in response to an instruction signal received from the obstacle detecting unit, wherein a blowing direction of the gas delivery device is changed in accordance with at least one of size, direction as viewed from the vehicle, and relative velocity of an obstacle detected by the obstacle detecting unit.

10. The vehicle according to claim 9, wherein:
the vehicle comprises a plurality of the gas delivery devices according to claim 1; and
driving/non-driving of each of the plurality of gas delivery devices is controlled on a basis of at least one of size, direction as viewed from the vehicle, and relative velocity of the obstacle detected by the obstacle detecting unit.

11. A gas delivery device comprising:
a first substrate unit and a second substrate unit, the first substrate unit and the second substrate unit each having a plurality of linear electrodes disposed on a principal surface of a substrate in a width direction and being electrically connected in a predetermined period in an arrangement order; and
a drive voltage power supply unit configured to apply respective drive voltages with repeating patterns to the linear electrodes of each of the substrate units, the respective drive voltages with repeating patterns having a predetermined phase difference,
wherein a gap is provided between the first substrate unit and the second substrate unit, and the principal surface of the substrate of each of the first substrate unit and the second substrate unit faces the gap, and
wherein the respective drive voltages applied to the first substrate unit and the second substrate unit are set to different predetermined frequencies.

12. The gas delivery device according to claim 11, wherein the first substrate unit and the second substrate unit have the same structure.

13. The gas delivery device according to claim 11, further comprising a scent generating unit configured to provide a volatile fragrance.

14. The gas delivery device according to claim 13, wherein the scent generating unit is disposed in the gap or in a gas flow passage that communicates with the gap.

15. The gas delivery device according to claim 13, wherein the scent generating unit is configured to control an amount of volatilization of the volatile fragrance.

16. The gas delivery device according to claim 11, wherein the first substrate unit and the second substrate unit are disposed in parallel to each other.

17. The gas delivery device according to claim 11,
wherein the first substrate unit and the second substrate unit each have a suction-side end portion and an exhaust-side end portion, and
wherein the first substrate unit and the second substrate unit are disposed at an inclined position with respect to each other, such that the respective exhaust-side end portions are closer in distance than the respective suction-side end portions.

18. The gas delivery device according to claim 11, further comprising a gate driver circuit configured to switch the ratios between the repeating patterns of the respective drive voltages to control a blowing direction of the gas delivery unit.

19. A vehicle comprising:
the gas delivery device according to claim 11 disposed within the vehicle;
an obstacle detecting unit disposed outside the vehicle that is configured to detect an obstacle; and
a control unit configured to output a control signal to supply the respective drive voltages in response to an instruction signal received from the obstacle detecting unit,
wherein a blowing direction of the gas delivery device is changed in accordance with at least one of size, direction as viewed from the vehicle, and relative velocity of an obstacle detected by the obstacle detecting unit.

20. A vehicle comprising:
a plurality of the gas delivery devices according to claim 11;
an obstacle detecting unit configured to detect an obstacle; and
a control unit configured to output a control signal to supply the respective drive voltages in response to an instruction signal received from the obstacle detecting unit,
wherein a blowing direction of each of the gas delivery devices is changed in accordance with at least one of size, direction as viewed from the vehicle, and relative velocity of an obstacle detected by the obstacle detecting unit.

* * * * *